May 15, 1962 J. K. LIVINGSTONE 3,035,122

CONSTANT CURRENT LINE CIRCUIT FOR LOOP TELEPHONE LINES

Filed Sept. 30, 1958 2 Sheets-Sheet 1

INVENTOR.
JAMES K. LIVINGSTONE

BY

Francis E. Blake

ATTORNEY

May 15, 1962 J. K. LIVINGSTONE 3,035,122

CONSTANT CURRENT LINE CIRCUIT FOR LOOP TELEPHONE LINES

Filed Sept. 30, 1958 2 Sheets-Sheet 2

*INVENTOR.*
JAMES K. LIVINGSTONE

*BY* Francis E. Blake

ATTORNEY 3,035,122

CONSTANT CURRENT LINE CIRCUIT FOR LOOP TELEPHONE LINES

James K. Livingstone, Webster, N.Y., assignor to General Dynamics Corporation, Rochester, N.Y., a corporation of Delaware Filed Sept. 30, 1958, Ser. No. 764,387
11 Claims. (Cl. 179—16)

This invention relates to telephone line circuits and, more particularly, to line circuit arrangements for feeding line current from the telephone exchange over a loop telephone line to the subscriber subset.

The so-called telephone line circuit for introducing the operating line current into a loop telephone line from a telephone exchange to a subscriber subset is well known. The principal functions of the line circuit are to introduce so-called talking battery or line current into the line and to respond to on-hook and off-hook conditions of the line, such as when the loop is opened or closed, respectively, to provide signaling supervision between the subscriber and the central office. One of the problems with conventional line circuit arrangements is the variation of line current due to differences in the loop resistance of the line for varying lengths of lines between the exchange and the subscriber. Very long loop telephone lines have comparatively high resistance and the voltage drop of such line is appreciable such that the line current tends to decrease below a minimum desirable amount for efficient operation of the subset apparatus.

It is the principal object of the present invention to provide an improved arrangement for connecting a source of power such as a station battery to a loop telephone line in a manner to maintain a substantially constant line current over varying lengths of loop telephone lines.

Another object of the present invention is to provide a constant current line circuit for a loop telephone line that will be relatively insensitive to the frequencies of alternating speech currents normally applied to the line by the subset apparatus.

Yet another object of the invention is to provide an improved constant current line circuit for loop telephone lines employing simple and reliable solid-state components.

Further objects, features, and the attending advantages of the invention will be apparent with reference to the following specification and drawings in which.

The various modified forms of the constant current line circuit of the invention will be described in simplified arrangements wherein the line circuit supervision details are omitted. It should be understood that any suitable supervision circuits may be provided to respond to the flow of line current over the loop telephone line when the subscriber subset is off-hook to thereby close the loop over the telephone line and cause line current to flow.

Figure 1:
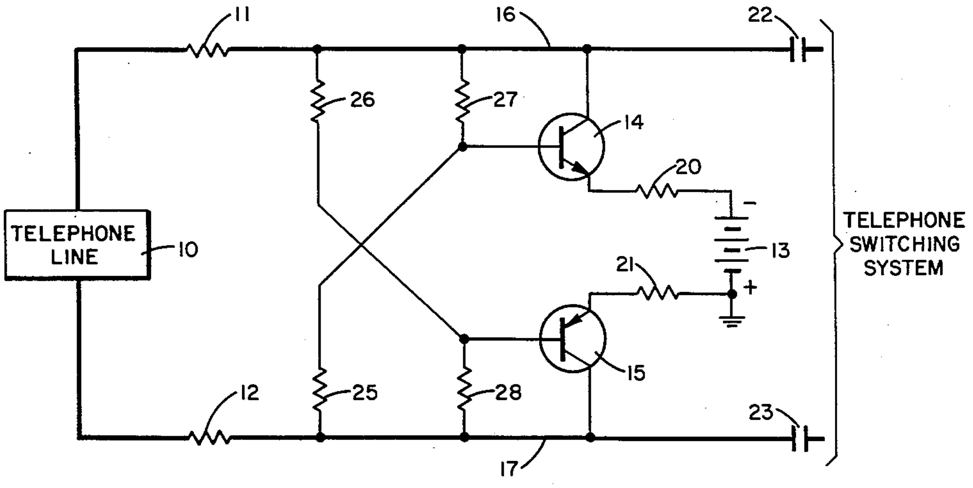
FIG. 1 is a schematic diagram of a preferred embodiment of the invention as arranged for balanced line operation.

Referring now to FIG. 1 of the drawings, a loop telephone line and subscriber subset is indicated by the box designated 10 and the resistances 11 and 12 are shown to be representative of the line resistance which, of course, may vary with the length of the line from the telephone exchange to the subscriber subset. The constant current line circuit of the invention is located in the telephone exchange and is connected to the respective tip and ring conductors of the loop telephone line at the telephone exchange so that the majority of the telephone line resistance is present between the telephone exchange and the telephone subset at the end of the telephone line. The telephone exchange battery is indicated at 13 and is a conventional direct current source having its positive terminal grounded, as is customary in telephone practice.

Power transistors 14 and 15 are provided with their emitter collector electrode circuits connected in series between respective terminals of the station battery 13 and a respective one of the conductors 16 and 17 of the loop telephone line. More particularly, transistor 14 is a NPW type of power transistor whose emitter electrode is connected in series with a balancing resistor 20 to the negative terminal of the battery 13. Similarly, the transistor 15 is a PNP type of power transistor whose emitter electrode is connected in series with a balancing resistor 21 to the positive terminal of the station battery. The line conductors 16 and 17 may be connected into the telephone switching system of the exchange through suitable isolating capacitors 22 and 23. The base electrode of transistor 14 is connected by circuit means including a resistance 25 to the telephone line conductor 17 which is the line conductor other than the conductor to which the emitter collector circuit of transistor 14 is connected. Similarly, the base electrode of transistor 15 is connected in a circuit including resistance 26 to the telephone line conductor 16 which is the conductor other than the line conductor to which the emitter collector circuit of transistor 15 is connected. Such connection of the base electrode of either transistor 14 or 15 through either resistor 25 or 26, respectively, to the respective telephone line conductor causes the potential on the base electrode of the respective transistor to vary in accordance with variations in resistance of the telephone line between the telephone exchange including the resistance of the line as indicated at 11, 12, and the subset apparatus 10. The described arrangement of connection to the respective base electrodes of transistors 14 and 15 is such that generally good automatic current regulation is obtained over a fairly wide range of variation of telephone line loop resistance.

To further improve and stabilize the automatic line current regulation, a reference potential circuit including resistor 27 may be connected between the base electrode of transistor 14 and the telephone line conductor 16 to which the collector electrode of transistor 14 is connected. Similarly, a reference potential circuit including resistance 28 may be connected from the base electrode of transistor 15 to the telephone line conductor 17 to which the collector electrode of transistor 15 is connected. It should also be mentioned that the previously described balancing resistances 20 and 21 are provided for the purpose of obtaining balanced line operation, as should be understood by those skilled in the art.

Figure 2:
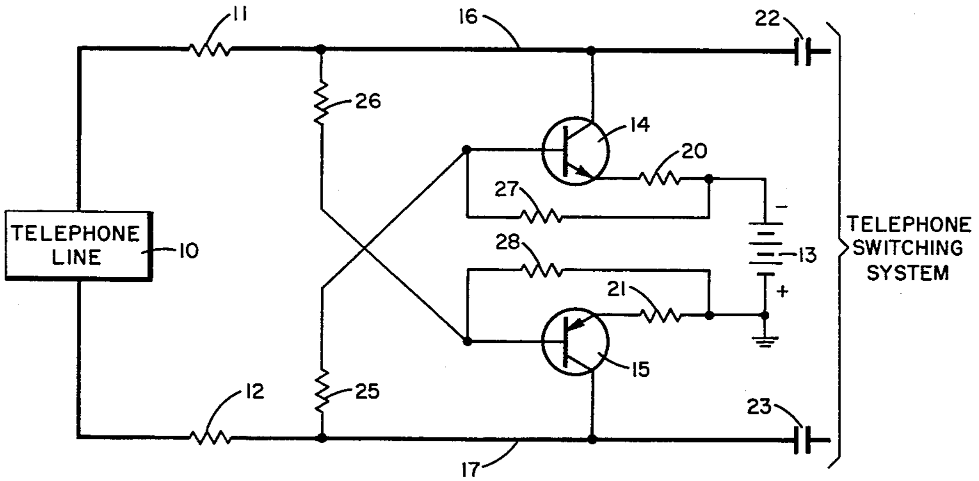
FIG. 2 is a schematic diagram of a modified form of the invention shown in FIG. 1 for use with balanced lines.

A modified form of the line circuit arrangement described above in connection with FIG. 1 of the drawings, is shown in FIG. 2 of the drawings. The same reference numerals will be applied to similar circuit elements for both FIGS. 1 and 2 of the drawings and will not be further described at this time. The principal difference between the circuit of FIG. 2 and that of FIG. 1 is that the reference potential circuit including resistors 27 and 28 is connected directly to the respective terminals of the station battery instead of to the line conductors 16 and 17. This modified arrangement may be desirable when certain characteristic types of transistors are employed.

Figure 3:
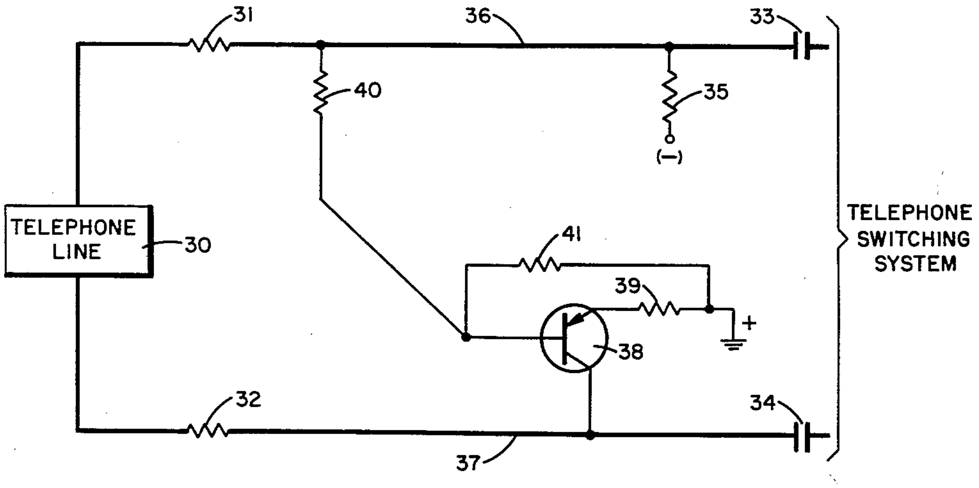
FIGURE 3 is another modified form of the invention for use with unbalanced telephone lines.

Referring now to FIG. 3 of the drawings, a modified form of the invention as may be used with unbalanced loop lines is disclosed. The telephone subset apparatus or other utilization device 30 and the loop line having loop resistance indicated at 31 and 32, which may vary with length of loop line, may be connected at the telephone exchange through capacitors 33 and 34 to the telephone switching system. The telephone station battery is not shown but its negative terminal is connected through a resistance 35 to a first conductor 36 of the telephone line. The other conductor 37 of the loop line is connected to the positive grounded terminal of the station battery in series with the emitter collector circuit of a current regulating power transistor 38 of the PNP type. A resistance 39 may be included in series with the emitter electrode of the transistor 38 and the grounded terminal of the station battery. The base electrode of transistor 38 is connected in a circuit including the resistor 40 to the line conductor 36 which is the conductor other than the conductor with which the emitter collector electrode circuit of the transistor 38 is connected. With this arrangement, the voltage drop proportional to line loop length and resistance is applied across the collector base circuit of the transistor 38 to provide an automatic current regulation action. A reference potential circuit including resistor 40 may also be connected between the base electrode of transistor 38 and the positive terminal of the station battery, much in a similar manner as the reference circuit resistors 27 and 28 in the form of the invention shown in FIG. 2 were connected.

Figure 4:
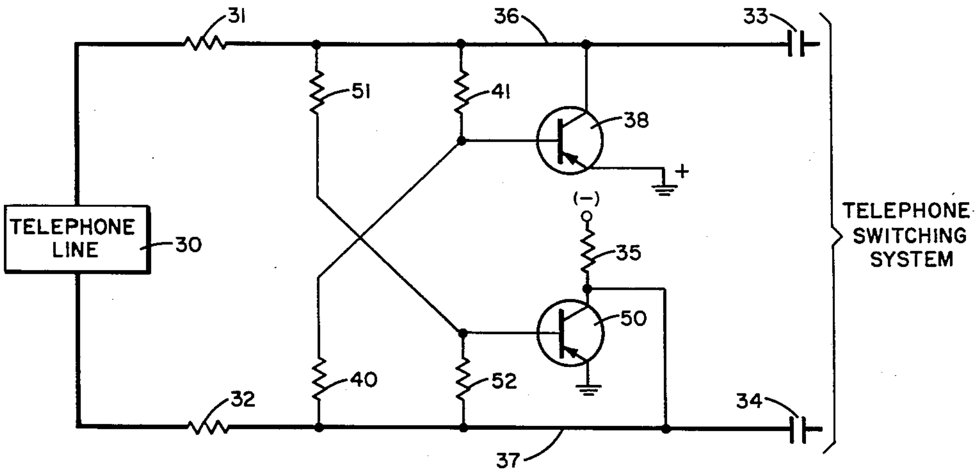
FIG. 4 is a schematic diagram of yet another modified form of the invention as devised for unbalanced line operation.

Referring now to FIG. 4 of the drawings, yet another form of unbalanced line constant current line source is disclosed. The battery source is not shown but its positive terminal connected to ground and negative terminal are indicated by the conventional positive and negative symbols. The loop line resistances 31 and 32 and the subset apparatus 30 may be the same as described in connection with FIG. 3 of the drawings and are given the same reference numerals. The positive terminal of the station battery is connected in series with the emitter collector electrode circuit of a PNP power transistor 38 to the first conductor 36 of the unbalanced loop line. The other conductor 37 of the unbalanced loop line is connected in series with a resistance 35 to the negative terminal of the station battery. The base electrode of the current regulating transistor 38 is connected in a circuit including resistor 40 to the second conductor 37 of the unbalanced loop line which is the conductor other than the conductor 36 to which the collector electrode of the transistor 38 is connected. The reference potential circuit including the resistor 41 in this form of the invention may be connected between the base electrode of transistor 38 and the first conductor 36 of the telephone line instead of to the positive terminal of the station battery as was shown in connection with FIG. 3 of the drawings. As thus far described, the arrangement of FIG. 4 is essentially the same as that of FIG. 3 of the drawings and provides a degree of line current regulation with the principal difference being the aforementioned method of connecting the reference resistance 41 to the line conductor 36 instead of to the source ground terminal. To provide additional current regulation, a power transistor 50 may be connected with its emitter collector circuit in shunt with the resistance of the telephone line 31, 32, and the telephone subset 30. The base electrode of the PNP power transistor 50 is connected for control purposes through a circuit including the resistance 51 to the first conductor 36 of the telephone line and through a reference resistance 52 to the second conductor 37 of the telephone line. It should be apparent that this arrangement is such that the shunt resistance of the transistor 50 automatically decreases for decreased resistance of the loop line in a manner to further regulate the current flow through the line by the division of current through the shunt connected transistor 50.

Referring to FIG. 1 of the drawings, a typical arrangement of the invention found to be operative and employing power transistors of the type designated may use the following table of values:

| | |
|---|---|
| Battery | 24 volts. |
| Transistor: | |
| **14** | Type 2N365. |
| **15** | Type 2N368. |
| Resistor: | |
| **27** | 3,300 ohms. |
| **28** | 3,300 ohms. |
| **25** | 27,000 ohms. |
| **26** | 27,000 ohms. |
| **20** | 67 ohms. |
| **21** | 67 ohms. |

The values for the circuit shown in FIG. 2 when using a station battery of 48 volt potential may be as follows:

| | |
|---|---|
| Transistor: | |
| **14** | Sylvania type 1305. |
| **15** | Sylvania type 1304. |
| Resistor: | |
| **25** | 56,000 ohms. |
| **26** | 56,000 ohms. |
| **27** | 9,100 ohms. |
| **28** | 9,100 ohms. |
| **20** | 100 ohms. |
| **21** | 100 ohms. |

Considering the table of values given above for the circuit of FIG. 2, it has been found that the loop current variation for a telephone line loop resistance varying from 100 ohms to 1332 ohms is substantially constant in the range of 32 or 33 milliamperes.

A table of values for a typical circuit arrangement shown in connection with FIG. 3 of the drawings using a station battery of 48 volts may be as follows:

| | |
|---|---|
| Transistor **38** | Sylvania type 1304. |
| Resistor: | |
| **40** | 56,000 ohms. |
| **41** | 9,100 ohms. |
| **39** | 100 ohms. |
| **35** | 200 ohms. |

With the values given above for the circuit of FIG. 3, the line current over the loop line having a loop resistance varying from 100 ohms to about 1250 ohms will be maintained within the range of approximately 38 milliamperes.

It should perhaps be pointed out that the use of a conventional shunt inductor feed telephone line circuit with a station battery of 24 volts would provide a variation of between 48 milliamperes and 15 milliamperes of line current for a loop variation of 100 to 1350 ohms, respectively. This may be compared with the improved results obtained with the constant current line circuit arrangement of FIG. 1, for example, in which for a variation of loop resistance in the range of 100 to 1350 ohms the loop current extreme variations are only between 8 and 12 milliamperes with a station battery of 24 volts. It will be seen, therefore, that the arrangement of the subject invention reduces the range of line current variation from a variation of about 33 milliamperes to a total variation of only about 4 milliamperes. With this improvement in line current regulation it is possible to obtain improved operation and simplified arrangements for the supervisory signaling at the central office responding to variations in loop telephone line loop current and it is also possible to provide improved efficiency of operation of the telephone subset apparatus since it is required to function over a much smaller range of variation of line current.

Various modifications will occur to those skilled in the art within the spirit of the invention and the scope of the appended claims.

What is claimed is:

1. In a telephone system, a central office, a plurality of subscriber telephones, a two conductor loop telephone line individually connecting each telephone to said central office, each of said lines having a particular resistance which is determined by the size and length thereof, a direct current power source of constant potential in said central office, a first transistor having base, emitter, and collector electrodes, first circuit means in said central office for connecting one terminal of said power source through the emitter-collector circuit of said transistor to one conductor of one of said telephone lines at the central office end thereof, second circuit means for connecting the other terminal of said power source through an impedance device to the other end of said one of said telephone lines at the central office end thereof, whereby the potential appearing at said central office end of said other conductor is a function of the series circuit formed by the emitter-collector resistance of said transistor, the particular resistance of said one of said telephone lines, and the resistance of said impedance device, third circuit means for connecting the base electrode of said transistor to said central office end of said other conductor of said one of said telephone lines to vary the emitter-collector resistance of said transistor in accordance with the potential of said other conductor to make the current through said series circuit substantially independent of the magnitude of said particular resistance of said one of said telephone lines.

2. A constant current line circuit for a two conductor loop telephone line whose impedance may vary with length comprising, a first transistor, a second transistor, a source of direct current, first circuit means for connecting one terminal of said source to one conductor of said line in series with the emitter collector circuit of said first transistor, second circuit means for connecting the other terminal of said source to the other conductor of said line in series with the emitter collector circuit of said second transistor, and third circuit means for connecting the base electrode of each of said transistors to the conductor of said line other than the conductor to which the respective emitter collector circuit of each transistor is connected.

3. A constant current line circuit for a two conductor loop telephone line whose impedance may vary with length comprising, a NPN transistor, a PNP transistor, a source of direct current, first circuit means for connecting the negative terminal of said source to one conductor of said line in series with the emitter collector circuit of said NPN transistor, second circuit means for connecting the positive terminal of said source to the other conductor of said line in series with the emitter collector circuit of said PNP transistor, and third circuit means for connecting the base electrode of each of said transistors to the conductor of said line other than the conductor to which the respective emitter collector circuit of each transistor is connected.

4. A constant current line circuit for a two conductor loop telephone line whose impedance may vary with length comprising, a first transistor, a second transistor, a source of direct current, first circuit means for connecting one terminal of said source in series with a first resistance and to one conductor of said line in series with the emitter collector circuit of said first transistor, second circuit means for connecting the other terminal of said source in series with a second resistance and to the other conductor of said line in series with the emitter collector circuit of said second transistor, and third circuit means for connecting the base electrode of each of said transistors to the conductor of said line other than the conductor to which the respective emitter collector circuit of each transistor is connected.

5. A constant current line circuit for a two conductor loop telephone line whose impedance may vary with length comprising, a NPN transistor, a PNP transistor, a source of direct current, circuit means for connecting the negative terminal of said source in series with a first resistance and to one conductor of said line in series with the emitter collector circuit of said NPN transistor, circuit means for connecting the positive terminal of said source in series with a second resistance and to the other conductor of said line in series with the emitter collector circuit of said NPN transistor, and circuit means for connecting the base electrode of each of said transistors to the conductor of said line other than the conductor to which the respective emitter collector circuit of each transistor is connected.

6. A constant current line circuit for a two conductor loop telephone line whose impedance may vary with length comprising, a first transistor, a second transistor, a source of direct current, circuit means for connecting one terminal of said source in series with a first resistance and to one conductor of said line in series with the emitter collector circuit of said first transistor, circuit means for connecting the other terminal of said source in series with a second resistance and to the other conductor of said line in series with the emitter collector circuit of said second transistor, circuit means for connecting the base electrode of each of said transistors to the conductor of said line other than the conductor to which the respective emitter collector circuit of each transistor is connected, and circuit means for connecting the base electrode of each of said transistors to the terminal of said source with which the respective transistor is connected in series to a conductor of the line.

7. A constant current line circuit for a two conductor loop telephone line whose impedance may vary with length comprising, a NPN transistor, a PNP transistor, a source of direct current, circuit means for connecting the negative terminal of said source in series with a first resistance and to one conductor of said line in series with the emitter collector circuit of said NPN transistor, circuit means for connecting the positive terminal of said source in series with a second resistance and to the other conductor of said line in series with the emitter collector circuit of said PNP transistor, circuit means for connecting the base electrode of each of said transistors to the conductor of said line other than the conductor to which the respective emitter collector circuit of each transistor is connected, and circuit means for connecting the base electrode of each of said transistors to the terminal of said source with which the respective transistor is connected in series to a conductor of the line.

8. A constant current line circuit for a two conductor loop telephone line whose impedance may vary with length comprising, a first transistor, a second transistor, a source of direct current, circuit means for connecting one terminal of said source in series with a first resistance and to one conductor of said line in series with the emitter collector circuit of said first transistor, circuit means for connecting the other terminal of said source in series with a second resistance and to the other conductor of said line in series with the emitter collector circuit of said second transistor, circuit means for connecting the base electrode of each of said transistors to said one conductor of said line, and circuit means for connecting the base electrode of each of said transistors to the said other conductor of said line.

9. A constant current line circuit for a two conductor loop telephone line whose impedance may vary with length comprising, a NPN transistor, a PNP transistor, a source of direct current, circuit means for connecting the negative terminal of said source in series with a first resistance and to one conductor of said line in series with the emitter collector circuit of said NPN transistor, circuit means for connecting the positive terminal of said source in series with a second resistance and to the other conductor of said line in series with the emitter collector circuit of said NPN transistor, circuit means for connecting the base electrode of each of said transistors to said one conductor of said line, and circuit means for connecting the base electrode of each of said transistors to said other conductor of said line.

10. A constant current line circuit for a two conductor loop telephone line whose impedance may vary with length comprising, a source of direct current, a first PNP transistor, circuit means for connecting the positive terminal of said source to one conductor of said line in series with the emitter collector circuit of said first transistor, circuit means for connecting the negative terminal of said source in series with a resistance to the other conductor of said line, a second NPN transistor, circuit means connecting the emitter collector circuit of said second transistor between said other conductor of said line and the positive terminal of said source, and circuit means for cross connecting the base electrode of each of said transistors to the conductors of said line.

11. A constant current line circuit for a two conductor loop telephone line whose impedance may vary with length comprising, a source of direct current, a transistor, circuit means for connecting one terminal of said source to one conductor of said line in series with the emitter collector circuit of said transistor, a resistance device interconnecting the other terminal of said source and the other conductor of said line, circuit means for connecting the base electrode of said transistor to said other conductor of said line, and circuit means for connecting the base electrode of said transistor to said one terminal of said source.

References Cited in the file of this patent

UNITED STATES PATENTS

| | | |
|---|---|---|
| 2,693,568 | Chase | Nov. 2, 1954 |
| 2,751,549 | Chase | June 19, 1956 |
| 2,832,035 | Bruck et al. | Apr. 22, 1958 |
| 2,841,757 | Shields | July 1, 1958 |
| 2,897,430 | Te Winkel | July 28, 1959 |
| 2,897,431 | Wolfendale | July 28, 1959 |
| 2,897,432 | Jackson | July 28, 1959 |

UNITED STATES PATENT OFFICE

CERTIFICATE OF CORRECTION

Patent No. 3,035,122 May 15, 1962

James K. Livingstone

It is hereby certified that error appears in the above numbered patent requiring correction and that the said Letters Patent should read as corrected below.

Column 2, line 19, for "NPW" read -- NPN --; column 6, lines 8 and 74, for "NPN", each occurrence, read -- PNP --.

Signed and sealed this 16th day of October 1962.

SEAL)
Attest:

ERNEST W. SWIDER
Attesting Officer

DAVID L. LADD
Commissioner of Patents